April 15, 1941. A. D. WARREN 2,238,838
AUTOMOBILE OR MOTOR VEHICLE ROBOT
Filed July 5, 1939 5 Sheets-Sheet 1
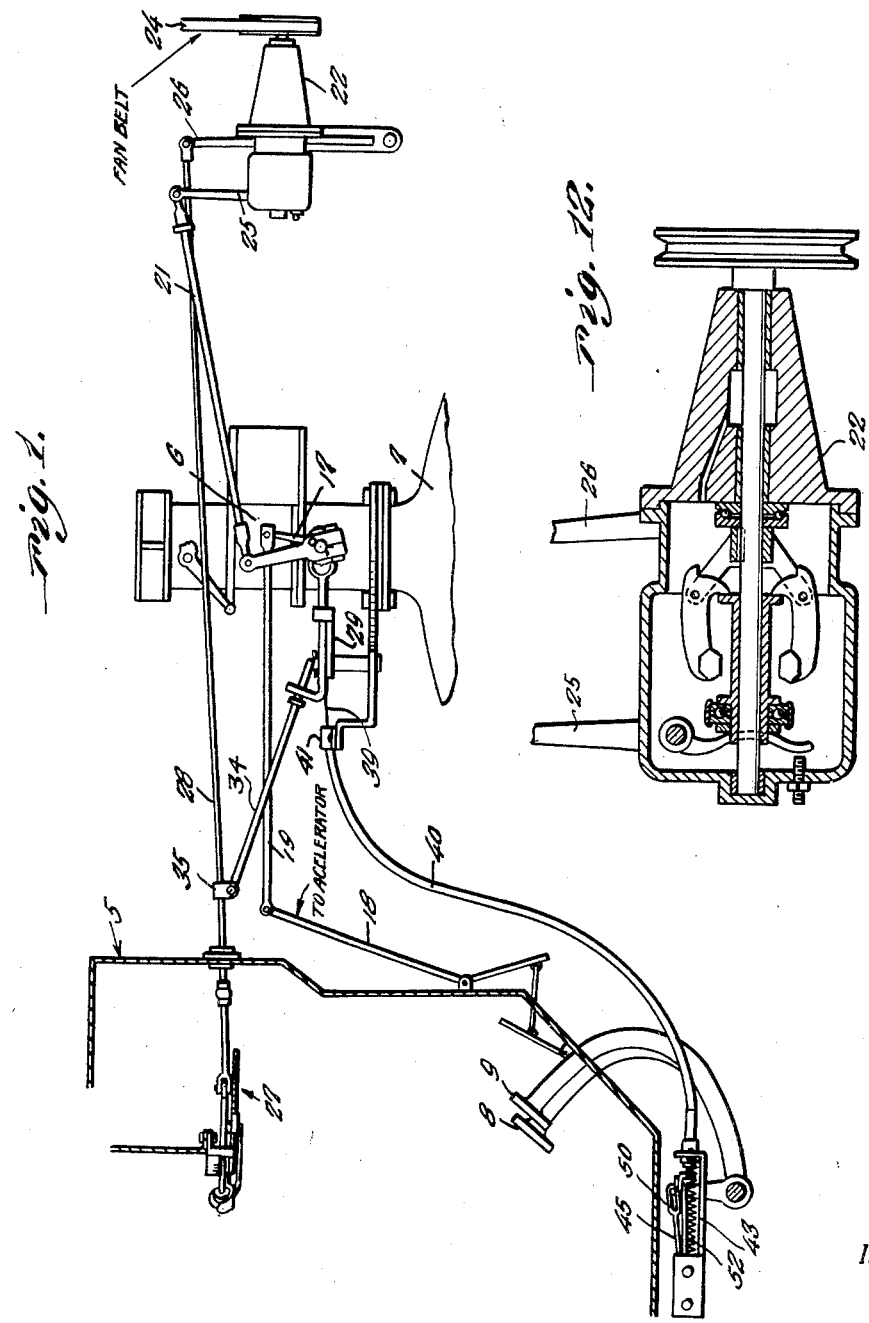
Inventor
A. D. Warren
By Clarence A. O'Brien
and Hyman Berman
Attorneys

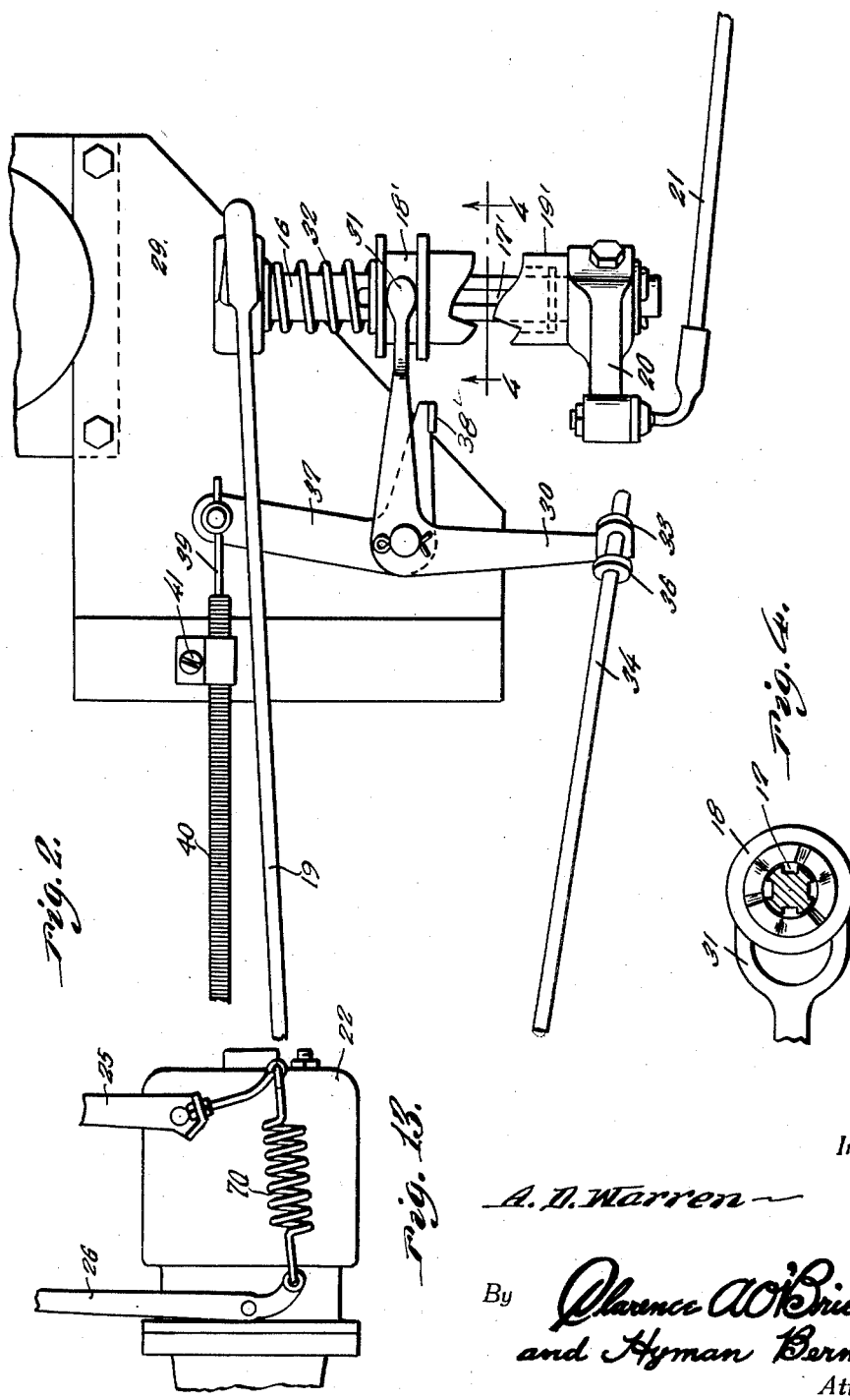

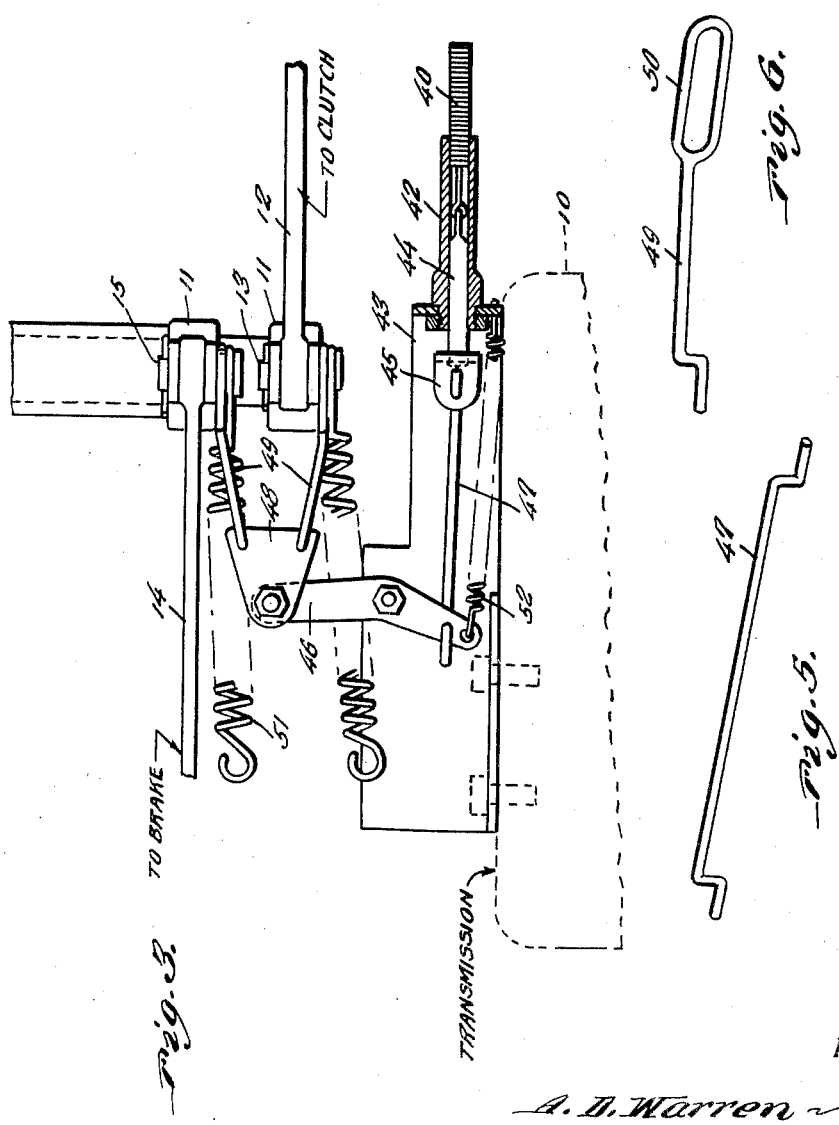

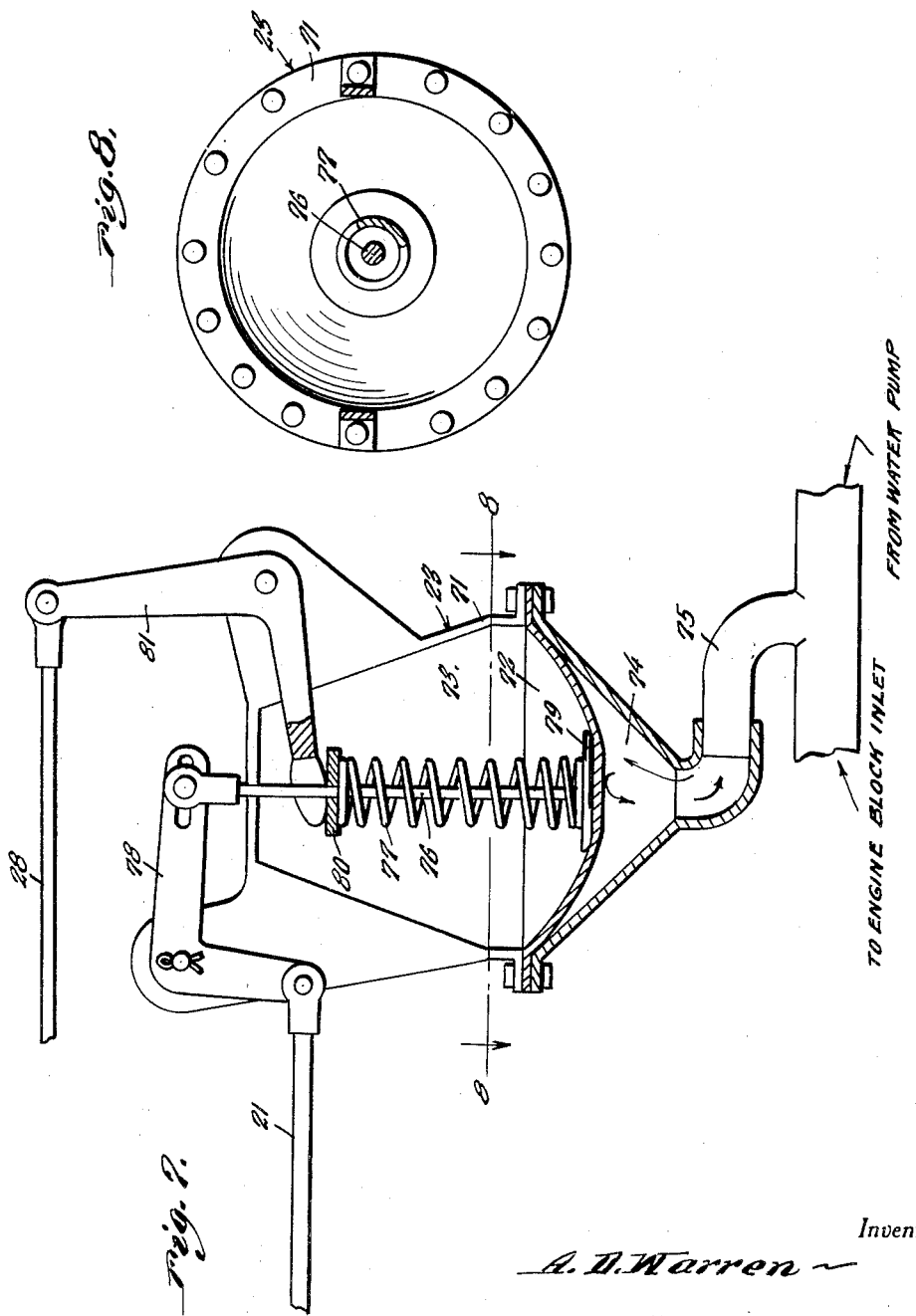

April 15, 1941.　　　A. D. WARREN　　　2,238,838
AUTOMOBILE OR MOTOR VEHICLE ROBOT
Filed July 5, 1939　　　5 Sheets-Sheet 5
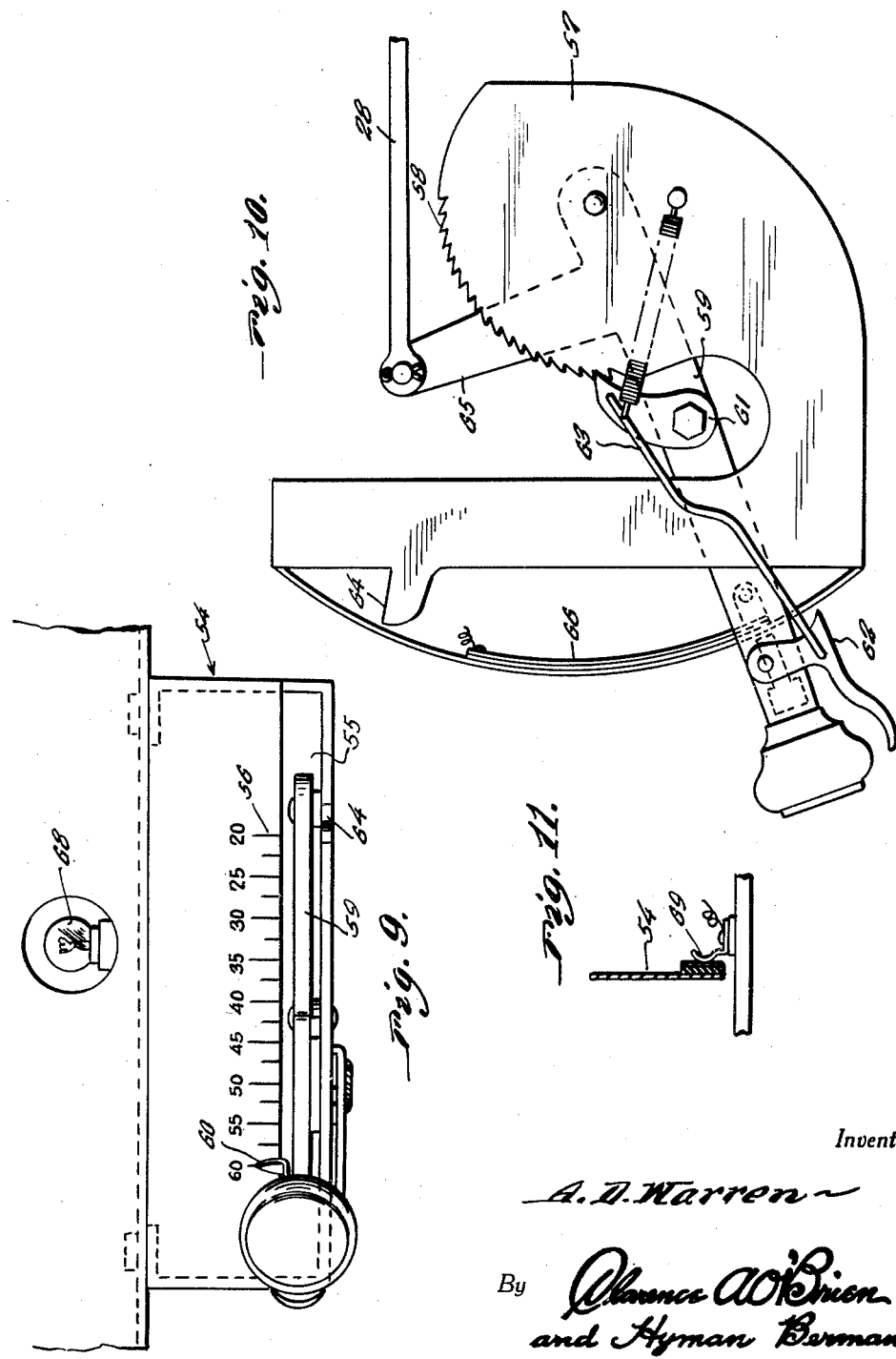

Patented Apr. 15, 1941

2,238,838

UNITED STATES PATENT OFFICE 2,238,838

AUTOMOBILE OR MOTOR VEHICLE ROBOT

Arlie Dee Warren, Muskogee, Okla.

Application July 5, 1939, Serial No. 282,953

1 Claim. (Cl. 137—139)

This invention relates to a robot for motor vehicles, and is especially adapted for maintaining the speed of travel of said vehicle at a selected rate of speed and has for the primary object the provision of a device of this character which will eliminate the necessity of the manual control of the throttle of said vehicle when driving long distances and it is possible to drive safely at some selected rate of speed, the device maintaining the speed of the vehicle constant regardless of the load variances on the engine of said vehicle and which obviates to a great extent fatigue on the driver as the foot used for operation of the throttle may be at rest and relaxed.

Another object of this invention is the provision of means whereby the driver of the vehicle may render the device operative or inoperative when desired and also may readily vary the speed of the vehicle by said device and further bring about inoperativeness of the device automatically with the manual slowing down or stopping of the vehicle.

With these and other objects in view, the invention consists in certain novel features of construction, combination and arrangement of parts to be hereinafter more fully described and claimed.

For a complete understanding of my invention, reference is to be had to the following description and accompanying drawings, in which Figure 1 is a fragmentary vertical sectional view showing the application of my invention to a portion of a motor vehicle.

Figure 2 is a fragmentary top plan view illustrating a clutch mechanism for connecting and disconnecting the governor mechanism with the throttle of the carbureter of the motor vehicle.

Figure 3 is a fragmentary top plan view, partly in section, showing the connection of the present invention with the clutch and brake mechanism of the motor vehicle.

Figure 4 is a detail sectional view taken on the line 4—4 of Figure 2.

Figure 5 is a perspective view illustrating a connecting rod.

Figure 6 is a perspective view illustrating a connecting link.

Figure 7 is a fragmentary vertical sectional view illustrating one type of governor mechanism which may be employed in conjunction with the present invention.

Figure 8 is a sectional view taken on the line 8—8 of Figure 7.

Figure 9 is a fragmentary front elevation illustrating a control mechanism.

Figure 10 is a fragmentary side elevation illustrating the control mechanism.

Figure 11 is a detail sectional view showing a circuit closer.

Figure 12 is a vertical sectional view illustrating one of the types of governors used in connection with this invention.

Figure 13 is a fragmentary side elevation illustrating one side of said governor.

Referring in detail to the drawings, the numeral 5 indicates a fragmentary portion of a motor vehicle body, 6 a carbureter connected to an intake manifold 7 of an engine (not shown) of the motor vehicle. The clutch and brake pedals of the motor vehicle are indicated by the characters 8 and 9 while a portion of the transmission housing of the motor vehicle is indicated by the character 10. The clutch and brake pedals 8 and 9 have connected to the journaled ends thereof arms 11. The arm 11 of the clutch pedal is shown connected to a clutch operating rod 12 by a pin 13 extending through said arm 11 while the arm 11 of the brake pedal is connected to a brake operating rod 14 by a pin 15. The foregoing described parts of the motor vehicle are briefly referred to for the purpose of hereinafter clearly explaining the application of the present invention to the motor vehicle. The carbureter 6 or throttle valve thereof (not shown) is equipped with the usual shaft 16 to which an arm 17 is secured. The arm 17 is connected to the accelerator mechanism 18 of the vehicle by a connecting rod 19. It is to be understood that all of the heretofore described construction is conventional on an automobile except the shaft 16 which is modified to permit the application of the invention to the carbureter. The shaft 16 has a splined portion 17' on which is slidably mounted a clutch element 18' adapted to coact with a clutch element 19' journaled on the shaft 16 and which has adjustably secured thereto an arm 20. A connecting rod 21 joins the arm 20 to a governor mechanism 22.

It is to be understood that the governor mechanism 22 may be of the type as shown in Figures 1 and 12 or of the type shown in Figures 7 and 8 and indicated by the character 23. The governor mechanism 22 is of a conventional construction and is manufactured and sold under the name of "Pierce" and is frequently employed for controlling speed of operation of internal combustion engines principally used for stationary work. Further, it is to be understood that the governor mechanism 22 is driven from the engine (not shown) of the motor vehicle by a belt 24. The governor mechanism 22 includes a throttle operating arm 25 and a control arm 26. The purpose of the control arm 26 is to vary the action of the governor on the throttle valve of the carbureter. The governor control arm 26 is connected to a speed varying control 27 forming a part of the present invention by a connecting rod 28.

A bracket 29 is mounted on the carbureter 6 and pivotally supports a bell crank lever 30, one end of which is forked, as shown at 31, and received between spaced flanges of the clutch element 18'. The clutch element is normally urged in the direction of the clutch element 19' by a coil spring 32. The other end of the bell crank lever 30 has an upstanding apertured ear 33 which slidably receives a connecting rod 34. The connecting rod 34 is secured on the connecting rod 28 by a clamp 35 including a pivot which will permit the rod 34 to pivot relative to the rod 28. A stop collar 36 is mounted on the connecting rod 34 to engage with the ear 33 after a predetermined movement of the rod 34 by the rod 28 for the purpose of pivoting the bell crank lever 30 to bring about disengagement of the clutch element 18' from the clutch element 19' and thereby free the connections between the governor mechanism and the throttle valve of the carbureter.

A bell crank lever 37 is pivotally mounted on the bracket 29 employing the same pivot as the bell crank lever 30 and one end thereof carries a right angularly disposed extension 38 which is adapted to engage with the bell crank lever 30 on movement of the bell crank lever 37 in one direction for the purpose of imparting pivotal movement to the bell crank lever 30 by the bell crank lever 37 to bring about disengagement of the clutch element 18' from the clutch element 19'. A Bowden wire 39 is connected to the bell crank lever 37 and one end of the housing 40 thereof is supported on the bracket 29 by a clamp 41. The sleeve 42 is carried by a bracket 43 mounted on the transmission housing 10 and serves to support the other end of housing 40. A fitting 44 couples the Bowden wire 39 to a head 45 which is connected to a bell crank lever 46 pivotally mounted on the bracket 43 by a connecting link 47. The bell crank lever 46 has pivoted to one end thereof a tie plate 48 to which are pivotally connected links 49 having elongated loop portions 50 which receive the pins 13 and 15 of the clutch and brake pedals. Coiled springs 51 are connected to the pins 15 and 13 and to some part of the vehicle for the purpose of restoring the clutch and brake pedals to their normal positions. A coiled spring 52 is connected to the bell crank lever 46 and to the bracket 43 tending to hold the bell crank lever 46 in such a position that the pins 15 and 13 will be positioned at one end of the looped portions 50 of the connecting rods or links 49. The specific connection as described and shown in the drawings between the bell crank lever 46 and the brake and clutch pedals is for the purpose of permitting the Bowden wire 39 to be actuated by either the clutch or brake pedals independently of each other or to be operated by the simultaneous movement of the brake and clutch pedal.

Thus it will be seen that the bell crank lever 37 will be operated by either the operation of the brake pedal or the clutch pedal or both. With this arrangement the driver of the vehicle when slowing down the vehicle depresses the brake pedal which brings about disengagement of the clutch elements 18' and 19' disconnecting the governor mechanism from the throttle valve of the carbureter. In many instances, the driver depresses the clutch pedal at the same time as he depresses the brake pedal which will also bring about disengagement of the clutch elements 18' and 19' or the depressing of the clutch pedal alone will bring about disengagement of the clutch elements 18' and 19'.

The control mechanism 27 heretofore briefly referred to consists of a casing 54 mounted in convenient reach of the driver of the motor vehicle and is provided with a slot 55 and located on the casing adjacent said slot are graduations 56 denoting miles per hour and in this instance as shown has from twenty miles per hour to sixty miles per hour. A portion of the casing 54 forms a quadrant 57, the teeth of which are indicated by the character 58. A control lever 59 is pivotally mounted on the quadrant and extends through the slot 55 and carries a pointer 60 moveable over the graduations 56 by the movement of the lever. A spring influenced dog 61 is pivotally mounted on the lever 59 to coact with the teeth 58 of the quadrant 57 for releasably securing the lever in various adjusted positions with respect to the graduations. A combined latch and hand grip 62 is pivotally mounted on the lever 59 adjacent the grip thereof and is connected to the dog 61 by a connecting rod 63 whereby the operator may release the dog from the teeth 58 for adjusting the lever 59 with respect to the graduations. A stop 64 is formed on the casing 54 adjacent one end of the slot and is adapted to be engaged by the combined grip and latch 62 for locking the lever 59 in a neutral position, that is, in a position for rendering the present invention inoperative. An extension 65 is formed on the lever 59 adjacent the pivoted end thereof and has the connecting rod 28 pivoted thereto.

Thus it will be seen through the varying of the position of the lever 59 the governor mechanism 22 may be controlled, also the clutch elements 18' and 19' may be engaged and disengaged.

A contact strip 66 is mounted on the casing 54 adjacent the slot 55 and extends the distance of the graduations on the casing and is engaged by a contact 69 carried by the control lever 59 when said control lever is positioned opposite any one of the markings of the graduations 56. The contacts 66 and 69 are connected in an electric circuit which includes therein a signal lamp 68 so as to give an indication or warning when the control lever 59 is in any of its positions other than neutral position.

The governor mechanism 22 includes in its construction a spring 70, the tension of which is varied through the movement of the arm 26 in opposite directions. When the arm 26 is moved to the right in Figure 1 the tension of the spring 70 is increased and when moved to the left is decreased. This spring 70 also acts on the arm 25 of the governor and the latter is further acted on by the speed of the engine. The movement of the arm 25 to the right in Figure 1 closes the throttle and the movement of the arm 25 to the left in Figure 1 opens the throttle. The tendency of the spring 70 is to open the throttle through the movement of the arm 25. The tension of the spring 70 is varied by the position occupied by the control lever 59 and when the latter is in neutral position, that is, with the combined grip and latch 62 in engagement with the stop 64 the tension on the spring 70 is at the lowest and as before stated, the clutch elements 18' and 19' are disengaged by the connection of the rod 34 to the rod 28 and the stop collar 36 engaging the end 33 of the bell crank lever 30 and imparting pivotal movement to the latter. When driving the motor vehicle at any speed below twenty miles per hour the throttle valve is operated through the accelerator mechanism as usual. However, where the vehicle is to be driven for a long distance and under safe road conditions, the operator moves the control lever 59 opposite to the graduation marking designating the speed at which it is desired for the vehicle to operate. When the control lever 59 assumes this latter-named position the signal lamp 68 is illuminated, a certain amount of tension is placed on the spring 70 of the governor mechanism and the clutch elements 18 and 19 are engaged which connects the governor mechanism to the throttle valve of the carbureter. With the governor mechanism connected to the throttle valve of the carbureter the speed of the engine will then be controlled automatically and maintained at the selected speed regardless of load condition. Should it be necessary to slow the vehicle down, the operator depresses either the clutch or brake pedal or both which brings about disengagement of the clutch element 18' from the clutch element 19' interrupting the control of the governor of the throttle valve and permitting the latter to be actuated as usual by the accelerator mechanism. As soon as the slowing down of the vehicle is discontinued, the clutch and brake pedals returning to normal position permit the spring 16 to engage the clutch element 18' with the clutch element 19' restoring the driving connection between the governor mechanism and the throttle valve of the carbureter so that the control of speed is then again at the selected speed or the setting of the control lever 59 with reference to the graduations 56 or the control mechanism 27.

The governor mechanism 23 may be substituted for the governor mechanism 22 on engines of motor vehicles that employ a positive circulation of the fluid in the cooling system. The governor mechanism 23 is in the form of a casing 71 in which is mounted a diaphragm 72. The diaphragm divides the casing 71 into separate chambers 73 and 74. The chamber 74 is connected directly to the cooling system of the engine of the motor vehicle by a pipe 75 so that the pressure of the fluid in said cooling system will be directly against the diaphragm at one side thereof while the opposite side of the diaphragm is engaged by a plunger-like member 76 under the influence of a spring 77. The member 76 has a pin and slot connection with a bell crank lever 78 pivotally mounted on the casing 71 and to which is pivoted the connecting rod 21. One end of the spring 77 seats against a head 79 which bears against the diaphragm while the other end of the spring 77 engages a collar 80 slidable on the member 76. The collar is engaged by a forked end of a bell crank lever 81 pivotally mounted on the casing 71 and to which is pivotally connected the connecting rod 28. Thus it will be seen that the tension of the spring 77 may be varied by the position occupied by the control lever 59 of the control mechanism 27. The action of the spring 77 is to open the throttle valve while the pressure in the chamber 74 of the casing of the cooling system acts to close the throttle valve.

Thus it will be seen that due to the increased speed of the engine with increased pressure of the fluid in the cooling system the throttle valve will be moved toward a closed position and as this pressure decreases the spring opens the throttle valve. This arrangement permits the speed of the vehicle to be maintained at the speed set by the control lever 59 of the control mechanism 27.

From the foregoing description taken in connection with the accompanying drawings it will be seen that a very practical, simple and efficient device has been provided which may be readily adapted to any motor vehicle now in use whereby the speed of the vehicle may be automatically maintained at a selected rate of speed and that the selected rate of speed may be varied at the will of the operator. Through the use of this invention when driving for long distances the device will relieve the operator of the manual control of the throttle valve of the vehicle. Further, it will be seen that the construction of the device is such that it will be automatically rendered inoperative when it is necessary to slow down or stop the vehicle, again coming into operation when the vehicle again reaches a predetermined speed under the control of the accelerator mechanism.

It is believed that the foregoing description, when taken in connection with the drawings will fully set forth the construction and advantages of my invention to those skilled in the art to which such a device relates, so that further detailed description will not be required.

What I claim is:

In a device of the class described, a pivotally mounted operating lever, a governor including a control arm, a rod connecting said lever and arm, a throttle operating arm connected to said governor, a clutch for connecting and disconnecting said operating arm to a throttle valve, a pivotally mounted bell crank lever connected to said clutch and including an apertured angularly disposed end, a second rod pivotally connected to said first rod and extending through the apertured end of the bell crank lever, and a stop collar formed on said second rod to engage with the apertured end of the bell crank lever.

ARLIE DEE WARREN.